United States Patent
Brodine

(10) Patent No.: US 7,408,464 B2
(45) Date of Patent: Aug. 5, 2008

(54) SYSTEM AND METHOD FOR IDENTIFYING COMPONENT PARTS IN AN ASSEMBLY

(76) Inventor: Michael L. Brodine, 18 E. Elbon Rd., Parkside, PA (US) 19015-3318

(*) Notice: Subject to any disclaimer, the term of this patent is extended or adjusted under 35 U.S.C. 154(b) by 75 days.

(21) Appl. No.: 11/267,430

(22) Filed: Nov. 7, 2005

(65) Prior Publication Data
US 2007/0103302 A1 May 10, 2007

(51) Int. Cl.
  B60R 25/10 (2006.01)
  G08B 13/14 (2006.01)
  G06F 7/00 (2006.01)
(52) U.S. Cl. .................. 340/572.1; 340/426.1; 307/10.2
(58) Field of Classification Search ... 340/568.1–572.9, 340/426.1, 427; 307/10.2, 10.5; 701/36
See application file for complete search history.

(56) References Cited

U.S. PATENT DOCUMENTS

| | | | | |
|---|---|---|---|---|
| 5,661,473 A | * | 8/1997 | Paschal | ................. 340/825.36 |
| 5,991,673 A | * | 11/1999 | Koopman et al. | ............. 701/32 |
| 6,317,026 B1 | | 11/2001 | Brodine | ....................... 340/5.8 |
| 6,888,462 B2 | | 5/2005 | Brodine | ................... 340/568.1 |
| 7,049,942 B2 | * | 5/2006 | Gallovich | ................ 340/426.1 |
| 7,076,665 B2 | * | 7/2006 | Reinold et al. | .............. 713/189 |

* cited by examiner

Primary Examiner—George A Bugg
Assistant Examiner—Jennifer Mehmood
(74) Attorney, Agent, or Firm—LaMorte & Associates

(57) ABSTRACT

A system and method for identifying stolen component parts contained within a product and/or identifying the origin of a component part. To utilize the system, an integrated transmitter assembly is attached to at least some component parts within a product. Each of the integrated transponder assemblies transmits an identification code. In a database, the identification codes of the integrated transponder assemblies are recorded along with the identification of the assembly into which they were originally installed. Products in the marketplace are periodically scanned. As products are scanned, the integrated transponders contained in those products transmit their identification codes. The identification codes are read and compared to the data in a database. If a scan reveals a component part listed as stolen, an indication is provided.

5 Claims, 6 Drawing Sheets

SYSTEM AND METHOD FOR IDENTIFYING COMPONENT PARTS IN AN ASSEMBLY

BACKGROUND OF THE INVENTION

1. Field of the Invention

The present invention relates to devices and methods that are intended to identify the individual parts used in a larger assembly, such as a vehicle, thereby allowing those parts to be identified if stolen. More specifically, the present invention relates to identification systems where each component part of an assembly is encoded and can be electronically identified.

2. Description of the Prior Art

Every year thousands of cars, trucks and other vehicles are stolen. Many of those vehicles are taken apart and the individual parts are resold. The individual parts rarely contain vehicle identification numbers. Consequently, it is nearly impossible to determine if a used part came from a stolen vehicle or from a legitimate supplier.

Thieves also commonly break into vehicles and steal parts from those vehicles. For example, every year thousands of radios, air bags, wheels, seats and the like are stolen from vehicles. To combat such thefts, systems have been developed that provide an encoded identification number to electronic subassembly parts, such as radio and air bags. Such encoded electronic subassemblies transmit their encoded identification number to the main computer module of the vehicle. When the vehicle is being serviced and the main computer module is connected to a diagnostic computer, the encoded identification numbers of its subcomponents can be compared to identification numbers stored in a database of stolen parts. If a subcomponent is identified as being a stolen part, authorities can be notified. Such prior art stolen article identification systems are exemplified by U.S. Pat. No. 6,317,026 to Brodine (the applicant herein), entitled Vehicle Part Identification System And Method.

A problem associated with such prior art part identification systems is that they are only good for identifying electronic parts, such as air bags and radios that communicate with the main computer of the vehicle and are connected to the battery power of the vehicle. Such prior art identification systems are of no use in identifying non-electronic components such as wheels, fenders, seats and the like. Furthermore, such prior art identification systems cannot identify any part unless that part is installed in a vehicle. Thus, stolen parts that are on a store shelf or are in the junkyards of used part suppliers cannot be readily identified until after those parts are bought and installed.

In U.S. Pat. No. 6,888,462 to Brodine (the Applicant herein), entitled System And Method For Identifying Component Parts In An Assembly, a system is shown that attaches passive RFID transponders to various component parts of an automobile. In order to activate the passive RFID transponders, the vehicle or vehicle part must be subjected to a strong electro-magnetic field. Only then would the passive RFID transponders have the power to transmit identification data that can be used to tell if the component piece is stolen.

Devices that create electro-magnetic fields strong enough to active RFID transponders through an entire automobile must be powerful. Accordingly, such activation devices tend to be large, heavy and expensive. This has limited the practicality of the system.

A need therefore exists for a component part identification system that can be applied to all component parts that can be used to identify a stolen component part at any location without the need of generating an electro-magnetic field. This need is met by the present invention as described and claimed below.

SUMMARY OF THE INVENTION

The present invention is a system and method for identifying stolen component parts contained within an assembly and/or identifying the origin of a component part. To utilize the present invention and system, integrated transmitter assemblies are attached to at least some component parts within a larger assembly. Each of the integrated transmitter assemblies constantly transmits an identification code for a long as the battery lasts. In a database, the identification codes of the integrated transmitter assemblies are recorded along with the identification of the larger product into which they were originally installed. If, at some point, the larger product is reported stolen, the identification codes for the component parts of that stolen product are marked in the database.

Products in the marketplace can be scanned at any time using a small portable receiver. As products are scanned, the integrated transmitter assemblies contained in those products transmit their identification codes. The identification codes are read and compared to the data in a database. If a scan reveals a component part listed as stolen, an indication is provided.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention device can be used to protect any component part of an assembly, such as the component parts of computers, farm equipment and the like, the present invention device is particularly well adapted for use in identifying the component parts of a vehicle. As a result, the present invention system will be primarily described in an application for protecting the component parts of a vehicle in order to set forth the best mode contemplated for the system.

A vehicle has thousands of component parts that are contained in hundreds of subassemblies. Many of these component parts and/or subassemblies are commonly stolen from vehicles or stripped from stolen vehicles and resold on the used part market. Such component parts and subassemblies, include, body trim, body panels, doors, wheels, radios, and a wide array of engine and drive train parts. A majority of such subcomponents do not contain internal circuitry and are not directly coupled to the battery of vehicle when installed on the vehicle.

Figure 1:
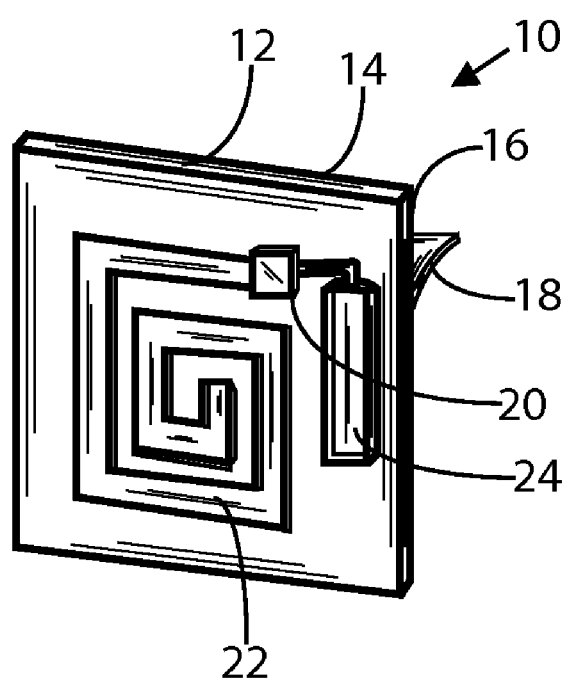
FIG. 1 is a perspective view of an exemplary embodiment of an integrated transmitter assembly that is used within the present invention identification system.

Referring to FIG. 1, an integrated transmitter assembly 10 is shown. The integrated transmitter assembly 10 includes a substrate 12. The substrate 12 can be rigid, but is preferably flexible so that it can conform to a slightly curved surface. The rear surface 14 of the substrate is covered in an adhesive coating 16. The adhesive coating 16 is protected with a peel-away layer 18 that prevents the adhesive coating 16 from becoming contaminated prior to use.

A radio frequency transmitter circuit 20 is printed onto the substrate 12 using conventional thick film or thin film circuit printing techniques. The radio frequency transmitter 20 is coupled to both a thin film antenna structure 22 and a thin film battery 24. A methodology for forming surface printable radio frequency transmitters and antennas are disclosed in U.S. Pat. No. 6,424,315 to Glenn, entitled Semiconductor Chip Having A Radio-Frequency Identification Transceiver. A surface printable thin film battery is disclosed in U.S. Pat. No. 6,835,493 to Zhang, entitled Thin Film Battery. The matter contained in U.S. Pat. No. 6,424,315 and U.S. Pat. No. 6,835,493 are both herein incorporated into this specification by reference.

The integrated transmitter assembly 10 can be made to be only a few millimeters square and less than one millimeter thick. Furthermore, the integrated transmitter assembly 10 is self-contained and will continue to operate even if the integrated transmitter assembly 10 is coated with paint and isolated from the surrounding environment. Once the integrated transmitter assembly 10 is activated, it will continuously transmit a radio frequency signal for as long as power can be supplied by the thin film battery 24. The thin film battery 24 preferably is made large enough to power the integrated transmitter assembly 10 for at least two years, which is statistically the most likely period in which automobiles are stolen.

Figure 2:
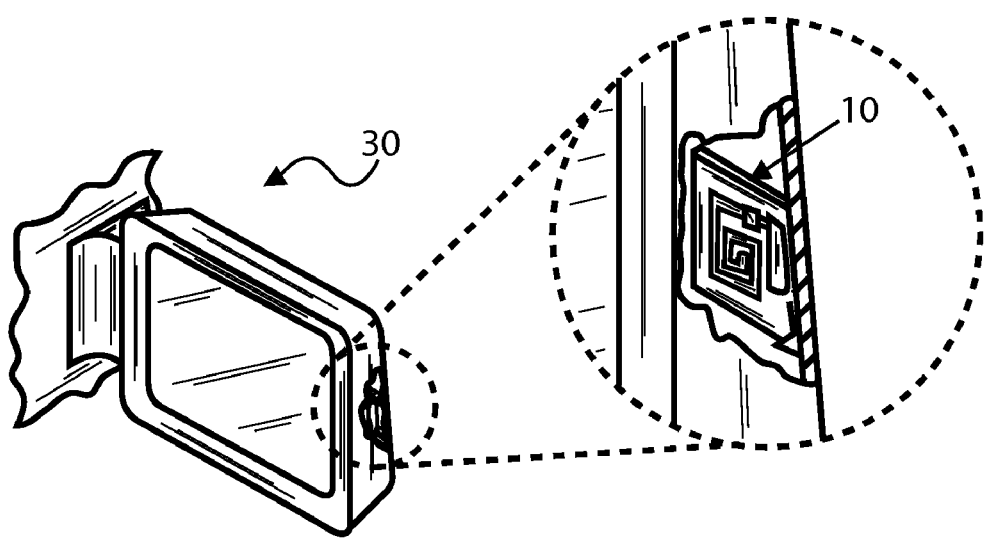
FIG. 2 is a partially fragmented perspective view of a component part containing the present invention identification system.

Referring to FIG. 2, a side mirror assembly 30 is illustrated. Within the structure of the mirror assembly 30 is placed an integrated transmitter assembly 10. The integrated transmitter assembly 10 is placed upon any surface within the mirror assembly 30. It is preferred that the integrated transmitter assembly 10 be placed on a bear surface prior to that surface being primed and/or painted. Once coated in paint or primer, the integrated transmitter assembly 10 will be visually undetectable. In this manner the integrated transmitter assembly 10 cannot be located and deactivated by a thief. Furthermore, by having the integrated transmitter assembly 10 covered by primer or paint, the integrated transmitter assembly itself is protected from moisture, salt and other such contaminants.

Figure 3:
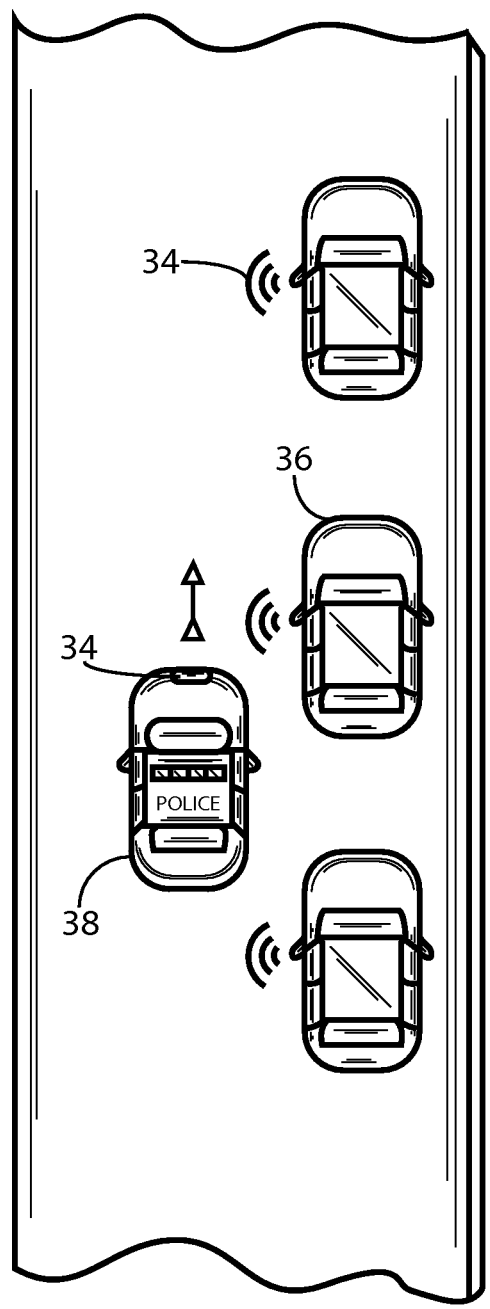
FIG. 3 shows vehicles containing the present invention system being scanned by a passing police squad car.

Referring to FIG. 3, it can be seen that the radio frequency signals 32 being transmitted by the various integrated transmitter assemblies can be detected by a small receiver 34 as soon as the receiver 34 comes within an effective range. Currently, an effective range would be within ten feet of the vehicle 36. Accordingly, a receiver 34 can be placed in a police squad car 38, wherein the receiver 34 can detect signals from vehicles parked along the side of the road. In this manner, a police squad car 38 can scan and detect stolen parts automatically as it patrols along the streets. Additionally, the police squad car 38 will automatically scan any vehicle that has pulled over by the police squad car 38. If any stolen component is detected, an indication is presented within the police squad car 38 for the law enforcement office to see.

Alternatively, a signal receiver can be placed at a toll booth, police check point, tunnel entrance or other confined space. As the vehicle 36 passes through the confined space, the vehicle 36 passes within range of the receiver. The identification codes from all the integrated transmitter assemblies are then read as the vehicle passes.

Although each integrated transmitter assembly can be manufactured to transmit its own unique identification code, it is preferred that a common group of integrated transmitter assemblies be manufactured to transmit the same identification code.

Since all the integrated transponder assemblies within a vehicle are transmitting the same identification signals, the strength of that identification signal is amplified in proportion to the number of integrated transponder assemblies present. If a vehicle contains one stolen part, the signal from the integrated transponder assembly within the stolen part will differ from the other signals emanating from the vehicle. This difference in signal type and signal strength can be used as a trigger indication to the presence of a stolen part.

Figure 4:
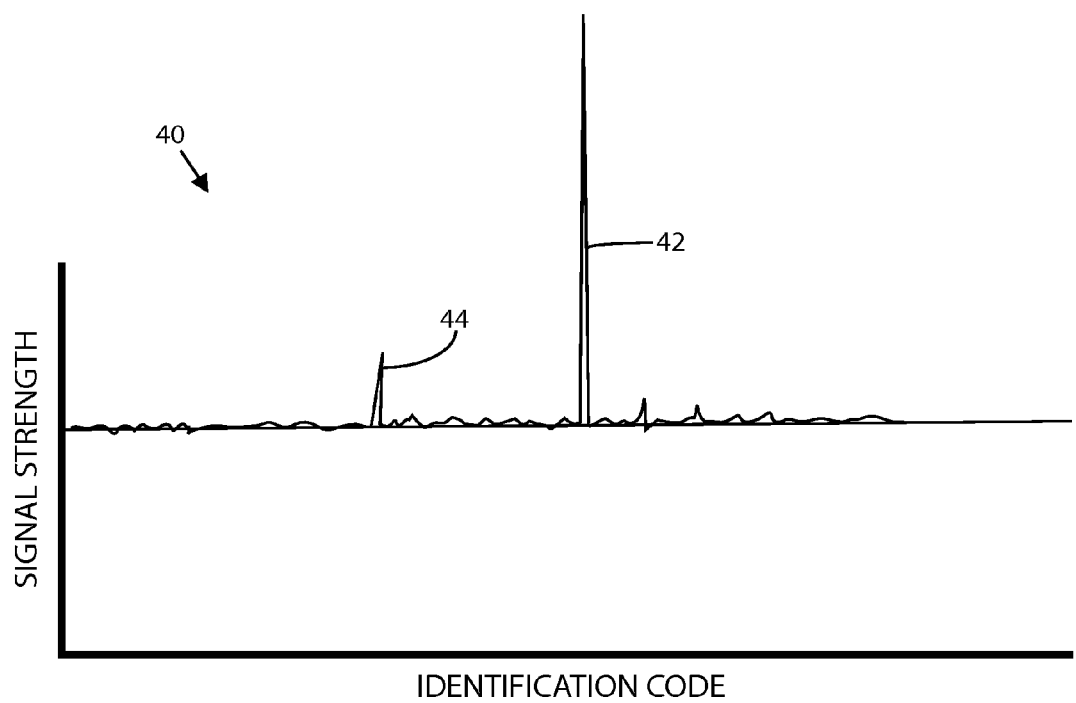
FIG. 4 is a graph that plots identification code verses signal strength.

Referring to FIG. 4, it a graph 40 is shown that plots signal identification code verses signal strength. If most of the components of an automobile have integrated transmitter assemblies that transmit a common identification code, the strength of that indemnification code signal is very strong. This is represented by the major spike 42 on the graph 40. However, if an automobile contains a stolen component, and that stolen component contains an integrated transmitter assembly, then that integrated transmitter assembly will transmit only one isolated identification code signal. This isolated identification code signal is represented by the minor spike 44 on the graph 40.

Similarly, if a stolen component that contains an integrated transmitter assembly is placed in a car that contains no other integrated transmitter assemblies, then that vehicle will transmit only one isolated identification signal.

A signal receiver can be programmed to detect the presence of isolated identification signals. If the presence of an isolated identification code is detected, that code can then be analyzed to see if it corresponds to a stolen part. If only a multi-fold strong identification signal is detected, it can be assumed that the parts are original to the automobile and that none of the parts are stolen. By selectively scanning only automobiles that meet the search criteria, computer resources are saved and vehicles can be scanned as fast as a police squad car can pass those vehicles.

Figure 5:
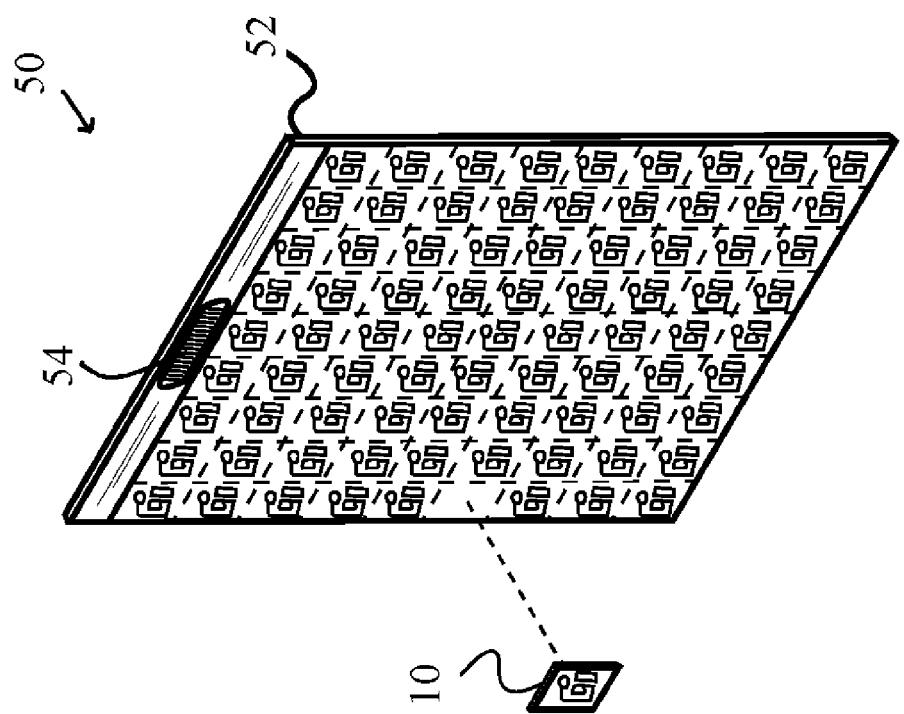
FIG. 5 is a perspective view of a pack of matched integrated transmitter assemblies.

Referring to FIG. 5, a set 50 of integrated transmitter assemblies 10 is shown. The passive integrated transmitters 10 are set into a pack sheet 52, wherein one integrated transmitter assembly 10 can be peeled away from the pack sheet 52 when desired. The pack sheet 52 is identified with a bar code or some other indicia 54 that is indicative of the identification code that will be transmitted by the integrated transmitter assemblies 10 in the set 50.

In a manufacturing environment that uses modern assembly line production, it is difficult to predict which subcomponents will be assembled together. As such, it would provide a logistics problem to insert a particular passive integrated transmitter into a subcomponent as that subcomponent is being manufactured. By using the pack sheet 52 of FIG. 5, the pack sheet 52 can be attached to a product at the beginning of the assembly line. As different subassemblies are added to the product along the length of the assembly line, different passive integrated transmitters 10 can be removed from the pack sheet 52 and added to the subassemblies. At the end of the assembly line, the final product will have its subcomponents all containing integrated transmitter assemblies 10 that transmit the same identification code when activated.

When applied to a vehicle, it will be understood that a set 50 of integrated transmitter assemblies 10 can be manufactured that transmit the vehicle identification code for that automobile when activated. The passive integrated transmitters 10 are added to the valuable parts of the automobile as the automobile is being assembled. Thus, parts such as the fenders, body panels hood, seats, mirrors and the like can all contain integrated transmitter assemblies 10 that transmit the vehicle identification code of the vehicle in which they where first assembled.

Figure 6:
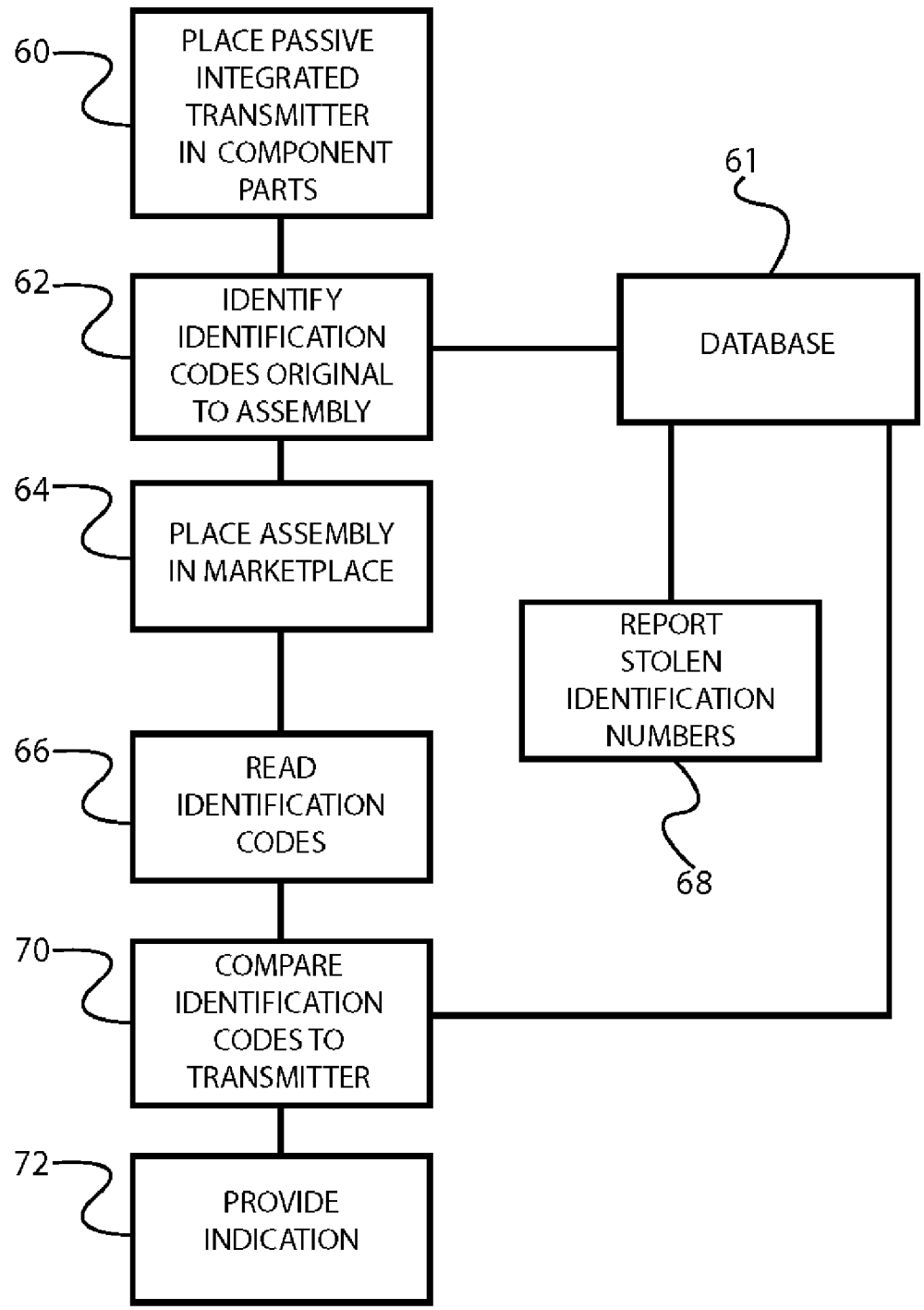
FIG. 6 is a block diagram schematic illustrating a method of operation in accordance with the present invention.

With this process in mind, the method of FIG. 6 can now be described. Referring to FIG. 6, in Block 60, it can be seen that integrated transmitter assemblies are added to the component parts of a larger product. The larger product can be a vehicle, a computer system or any other assembly of value. The integrated transmitter assemblies can each transmit either a common identification code or unique identification codes.

Referring to Block 62, it can be seen that the identification codes of the integrated transmitter assemblies of a larger product are recorded in a database 61. If the identification codes of the integrated transmitter assemblies all match, only one identification code need be recorded. If integrated transmitter assemblies with different identification codes are used in the larger product, each integrated transmitter assembly in the assembly is activated and the transmitted identification numbers are recorded in the database 61 as being associated with that product.

As is indicated by Block 64, once the identification code or codes that are associated with the integrated transmitter assemblies of a product and are recorded in the database 61, the product is placed into the marketplace.

In the marketplace, the product may be sold, resold, repaired and the like throughout the useful life of that product. Scanners are used to periodically scan products and parts in the marketplace. As is indicated by Block 66, when the product or parts of the product are scanned, the identification codes transmitted by the integrated transmitter assemblies are read. If the product is a vehicle, scans can be performed at toll booths, tunnels, police check points or by patrolling police cars. For other assemblies, such as car parts, computers and the like, scans can be made by store owners, repair shops and other retailers using portable receivers.

As has been previously explained, rapid scan can be performed by limiting full scans to products that have only one or two odd integrated transmitter assemblies that are not original equipment to that product.

As is indicated by Block 68, if a product or component part of a product is stolen while in the marketplace, the victimized owner can report the theft to authorities. The identification code or codes for the stolen product or component are identified as being stolen in the database 61.

As products and components are scanned in the marketplace, the identification codes read after each scan are checked against the information contained in the database 61. See Block 70. If a read identification code matches that of a stolen part or component, an indication is provided that tells the person or authority taking the scan that stolen property is present. See Block 72.

In a practical application of the method of FIG. 6, assume that the part of a stolen car containing a passive integrated transmitter is sold as a used part. That stolen part is then used to repair a damaged automobile. As the repaired automobile passes through a toll both or is scanned by a passing police squad car, the scanner would reads the presence of the stolen part. Authorities can then investigate the matter and would have a direct link to the source of the stolen part.

Once repair shops realize that stolen parts can be traced back to them, there will be a great incentive to stop using stolen parts. The market for stolen cars and stolen parts will then cease to exist.

In another application of the present invention system and method, assume there is a hit and run accident. Left behind at the scene of the accident is the passenger side mirror assembly of the hit and run vehicle. Utilizing the present invention system, police can now rapidly identify the exact vehicle from which that side mirror assembly came by scanning the integrated transmitter assembly that is located in the side mirror assembly.

It will be understood that the embodiment of the present invention described and illustrated herein is merely exemplary and a person skilled in the art can make many variations to the embodiment shown without departing from the scope of the present invention. All such variations, modifications and alternate embodiments are intended to be included within the scope of the present invention as defined by the appended claims.

What is claimed is:

1. A method of identifying stolen component parts contained within a product, said method comprising the steps of:
    attaching an integrated transmitter assembly to at least some component parts in a product, wherein each of said integrated transmitter assemblies transmits an identification code;
    providing a database;
    recording the identification codes of the integrated transmitter assemblies for said component parts in said database;
    indicating in said database which identification codes belong to stolen component parts, as component parts are reported stolen;
    scanning component parts, thereby reading identification codes transmitted by said integrated transmitters assemblies;
    determining if said integrated transmitter assemblies in a product are transmitting more than one identification code;
    comparing said identification codes read during scanning to said database if said integrated transmitter assemblies in a product transmit more than one identification code; and
    providing an indication if an identification code read during scanning matches an identification code of a stolen component part.

2. The method according to claim 1, wherein said product is a vehicle and said step of scanning occurs as a police scanner is driven past said vehicle.

3. The method according to claim 1, wherein said product is a vehicle and said step of scanning occurs during said vehicle being driven through a check point.

4. The method according to claim 1, wherein each of said integrated transmitter assemblies in said at least some component parts transmit a common identification code.

5. The method according to claim 4, wherein said assembly is a vehicle having a vehicle identification number and said common identification code corresponds to said vehicle identification number.

* * * * *